United States Patent
Kuo et al.

(10) Patent No.: US 7,219,846 B2
(45) Date of Patent: May 22, 2007

(54) CIRCUIT MODULE AND MEMORY CARD KIT COMPLIANT WITH VARIOUS ACCESS PROTOCOLS

(75) Inventors: Jeffrey Kuo, Taipei (TW); Chin-Yi Chiang, Taipei (TW); Abel Lien, Taipei (TW); Wallace Huang, Taipei (TW)

(73) Assignee: Via Technologies, Inc., Taipei (TW)

( * ) Notice: Subject to any disclaimer, the term of this patent is extended or adjusted under 35 U.S.C. 154(b) by 103 days.

(21) Appl. No.: 11/156,141

(22) Filed: Jun. 17, 2005

(65) Prior Publication Data

US 2005/0279839 A1  Dec. 22, 2005

(30) Foreign Application Priority Data

Jun. 17, 2004 (TW) ............................... 93117503 A

(51) Int. Cl.
*G06K 19/06* (2006.01)
(52) U.S. Cl. ...................................... 235/492; 235/486
(58) Field of Classification Search ............... 235/492, 235/449, 493, 486, 487, 380; 439/76.1
See application file for complete search history.

(56) References Cited

U.S. PATENT DOCUMENTS 5,929,414 A * 7/1999 Saitoh ........................ 235/380
6,484,946 B2 * 11/2002 Matsumoto et al. ........ 235/492
6,659,356 B2 * 12/2003 Kashima ..................... 235/492
6,890,188 B1 * 5/2005 Le ............................ 439/76.1
2003/0150915 A1 * 8/2003 Reece ........................ 235/449
2005/0087597 A1 * 4/2005 Gotfried et al. ............ 235/382
2006/0043172 A1 * 3/2006 Ho et al. .................... 235/380
2006/0163353 A1 * 7/2006 Moulette et al. ........... 235/449

FOREIGN PATENT DOCUMENTS

CN      1453686       11/2003

\* cited by examiner

*Primary Examiner*—Thien M. Le

(57) ABSTRACT

A circuit module of a memory card is selectively used with card readers/writers compliant with different access protocols. The circuit module includes a shared non-volatile memory; a first transmission control unit communicable with a first card reader/writer for controlling data transmission from/to the first card reader/writer; a second transmission control unit communicable with a second card reader/writer for controlling data transmission from/to the second card reader/writer; and a data buffer and memory access controller coupled to the non-volatile memory and the first and second transmission control units for conducting a data transmission path between a designated transmission control unit and the non-volatile memory, thereby allowing data transmission between the designated card reader/writer and the non-volatile memory. The circuit module can be grouped with different carrier housings to produce a memory card kit.

8 Claims, 5 Drawing Sheets

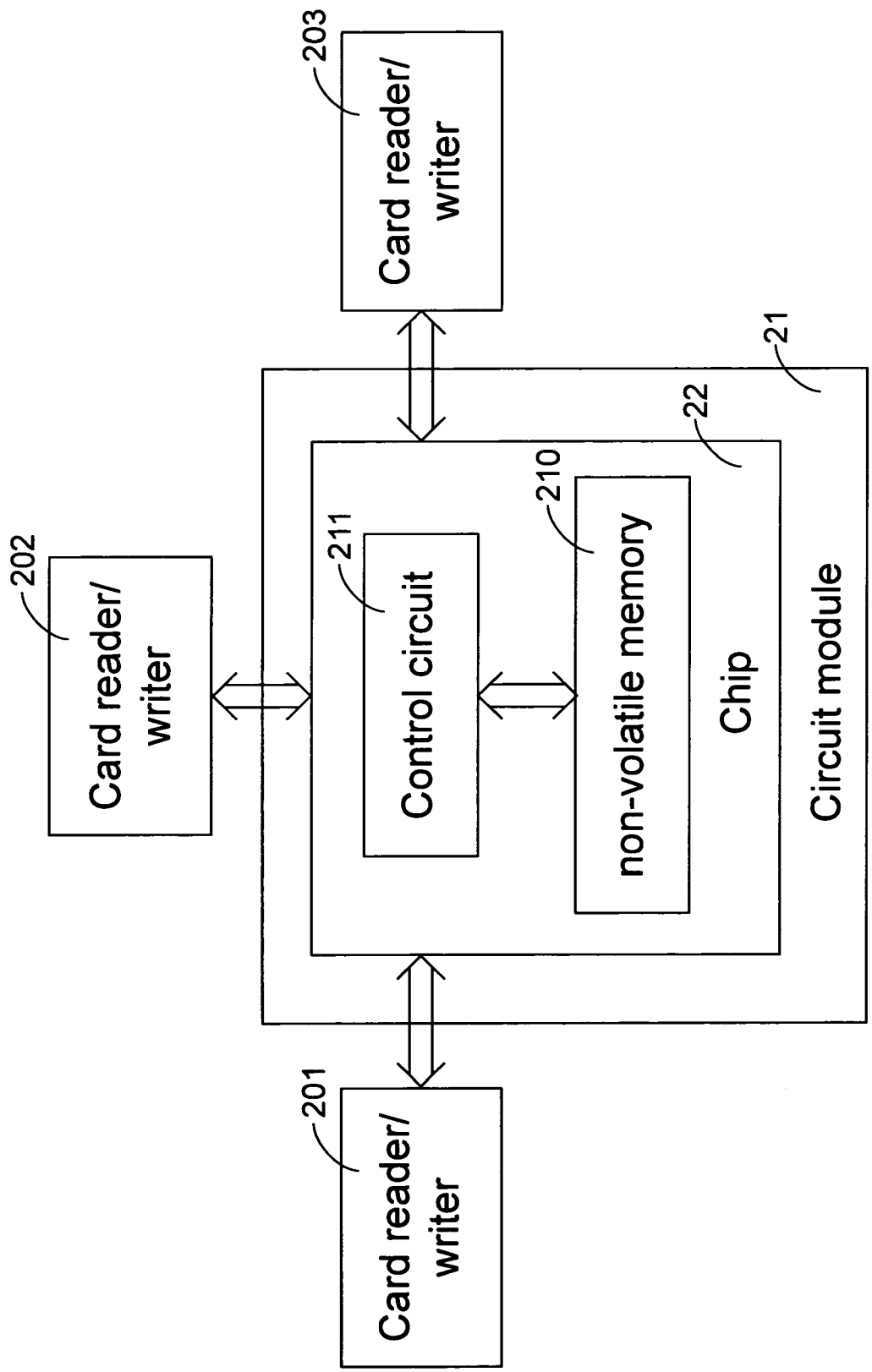

CIRCUIT MODULE AND MEMORY CARD KIT COMPLIANT WITH VARIOUS ACCESS PROTOCOLS

FIELD OF THE INVENTION

The present invention relates to a circuit module of a memory card, and more particularly to a circuit module of a memory card compliant with various access protocols. The present invention also relates to a memory card kit including a universal circuit module so as to comply with various access protocols.

BACKGROUND OF THE INVENTION

With the increase in bit size of digital files processed by electronic apparatus such as a computer system or digital camera, storage problems raised. Small-capacity storage media like floppy discs have been not practical enough to store digital files likely of several million bytes. Hence, flash memory modules with compact size and large capacity up to a couple of gigabytes (GB) are taking the place of conventional storage media. For example, the high-capacity flash memory modules are widely used in computer systems and portable digital peripheral equipments such as digital cameras.

Nowadays, there have been many kinds of memory cards in use, e.g. compact flash (CF) card, memory stick (MS) card, smart media card (SMC), secure digital (SD) card, multimedia card (MMC), microdrive card, etc. Different kinds of memory cards are compliant with different access protocols established by different manufacturers. The interface specification, control chip, and package mechanism of different memory cards are unique and incompatible mutually. Thus various memory cards are required for different electronic apparatus or different uses. Furthermore, the data accessible by an electronic apparatus compliant with a first access protocol is possibly unable to be transferred to another electronic apparatus compliant with a second access protocol. For example, a digital camera designed for a compact flash card cannot communicate with a secure digital card, and a card reader supporting a secure digital card cannot access the data stored in a compact flash card. Therefore, 6-in-1, 7-in-1, or 8-in-1 card readers are developed to cover as many uses as possible. Some slots in the multi-card reader, however, are never used. Hence, it seems to be an inefficient and uneconomic solution.

Please refer to FIG. 1, which is a functional block diagram illustrating a conventional memory card. The memory card 1 mainly includes a flash memory 10 and a controller 11 enclosed with a housing 12. Generally, the basic configuration of the flash memory 10 of the memory card 1 is identical to any other kinds of memory card currently used. But the controller 11 is different from that adapted to different access protocol. The dimension and size of the housing 12 also varies according to the memory card specification. Hence, production lines would be complicated for producing various controllers. Further, the stocks of parts for various controllers may cause a problem in cost control.

SUMMARY OF THE INVENTION

Therefore, the present invention provides a universal circuit module for complying with various access protocols so as to simplify the production lines and reduce stocking cost.

The present invention also relates to a memory card kit incorporating therein a universal circuit module so as to be applicable to various electronic apparatus.

The present invention provides a circuit module of a memory card for selective use with a first card reader/writer compliant with a first access protocol or a second card reader/writer compliant with a second access protocol. The circuit module includes a non-volatile memory; a first transmission control unit communicable with the first card reader/writer for controlling data transmission from/to the first card reader/writer; a second transmission control unit communicable with the second card reader/writer for controlling data transmission from/to the second card reader/writer; and a data buffer and memory access controller coupled to the non-volatile memory and the first and second transmission control units. The data buffer and memory access controller conducts a data transmission path between the non-volatile memory and a designated transmission control unit so as to allow data transmission between the non-volatile memory and a designated card reader/writer.

In one embodiment, the designated transmission control unit is automatically activated to conduct the data transmission path when the designated card reader/writer is electrically connected to the memory card.

Preferably, the non-volatile memory is a flash memory chip.

In one embodiment, the circuit module includes a data bus interfacing the first and second transmission control units with the data buffer and memory access controller for conducting the data transmission path.

In one embodiment, the data buffer and memory access controller comprises a non-volatile memory access controller in communication with the non-volatile memory for controlling the access to the non-volatile memory; and a data buffer and controller in communication with the data bus and the non-volatile memory access controller for data buffering and controlling data transmission from/to the designated transmission control unit via the data bus.

Optionally, the first and second transmission control units are integrated into a single chip. Alternatively, the data buffer and memory access controller and/or the non-volatile memory are integrated into the same chip.

The present invention also provides a memory card kit for selective use with a plurality of card readers/writers compliant with different access protocols. The memory card kit includes a shared circuit module and a plurality of carrier housings, each of which has a configuration fitting a connecting site of one of the plurality of card readers/writers and has a room for accommodating the shared circuit module. The shared circuit module includes a non-volatile memory; and a control circuit coupled to the non-volatile memory and communicable with the plurality of card readers/writers via a plurality of data transmission paths, respectively. When a designated card reader/writer is selected for use, the shared circuit module is mounted to a corresponding carrier housing fitting the connecting site of the designated card reader/writer, and the corresponding carrier housing is further coupled to the designated card reader/writer to allow data transmission between the non-volatile memory and the designated card reader/writer.

In one embodiment, the plurality of card readers/writers includes two card readers/writers compliant with two different access protocols, respectively. Preferably, the control circuit includes two transmission control units compliant with the two access protocols, respectively; and a data buffer and memory access controller. Only one of the transmission control units is activated at a time to conduct a data transmission path for communicating the corresponding card reader/writer with the non-volatile memory.

BRIEF DESCRIPTION OF THE DRAWINGS

The above objects and advantages of the present invention will become more readily apparent to those ordinarily skilled in the art after reviewing the following detailed description and accompanying drawings, in which:

FIGS. 2A and 2B are functional block diagrams illustrating circuit modules of a memory card compliant with various protocols according to embodiments of the present invention;

DETAILED DESCRIPTION OF THE PREFERRED EMBODIMENT

Figure 1:
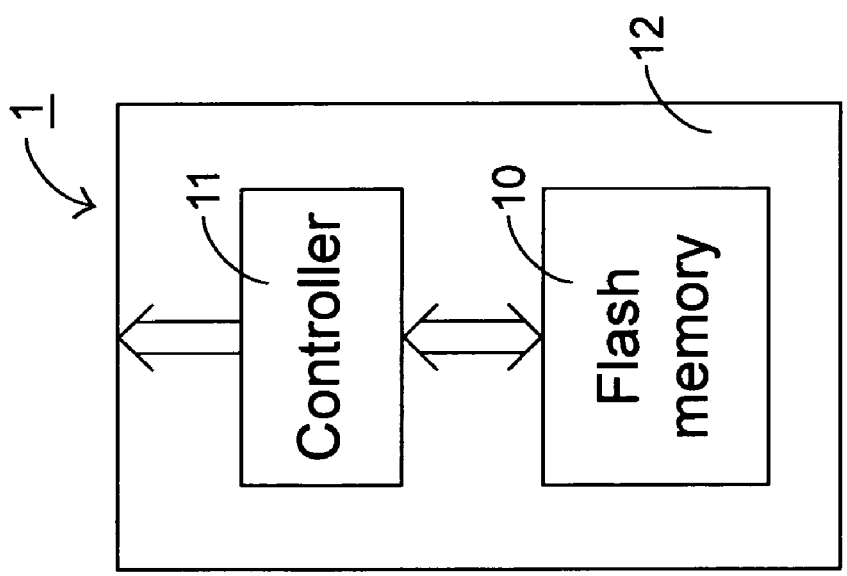
FIG. 1 is a functional block diagram illustrating a conventional memory card.
Figure 2A:
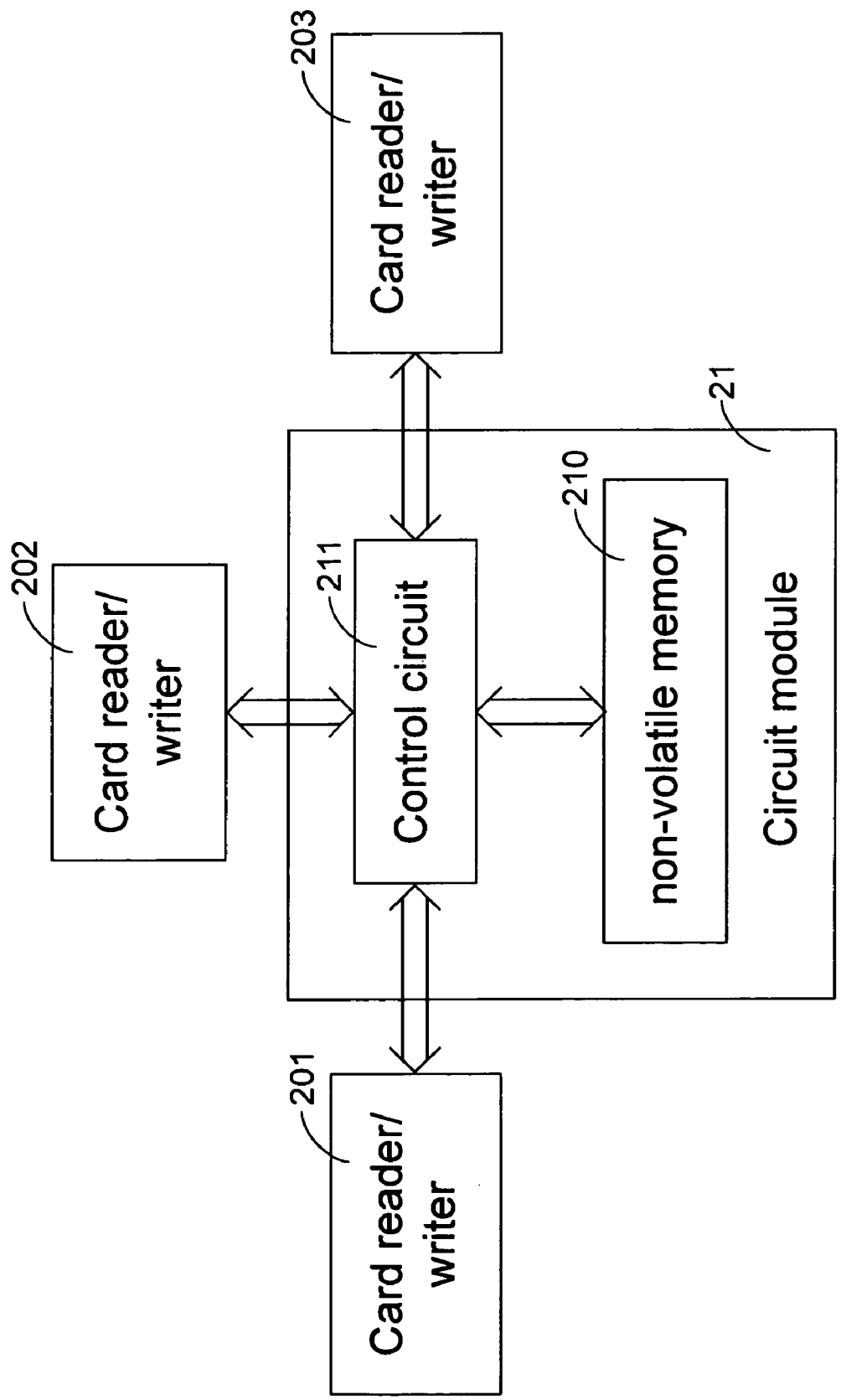

Please refer to FIG. 2A. A circuit module of a memory card compliant with various protocols according to a preferred embodiment of the present invention is illustrated. The circuit module 21 is communicable with, for example, three card readers/writers 201, 202 and 203 compliant with three different access protocols, respectively. The number of card readers/writers that the present circuit module can support is variable under the concept of the present invention and depends on the practical requirements such as world's trend and manufacturing process. For example, the card readers/writers 201, 202 and 203 are a secure digital reader/writer, a memory stick reader/writer and a compact flash reader/writer. The term "reader/writer" used herein means either a reader or a writer. The circuit module 21 includes a non-volatile memory 210 for storing data therein and a control circuit 211 coupled to the non-volatile memory 210. The non-volatile memory 210 can be implemented with a flash memory chip. The control circuit 211 supports data transmission between the non-volatile memory 210 and the three card readers/writers 201, 202 and 203 according to different access protocols so that the three card readers/writers 201, 202 and 203 can share the non-volatile memory 210.

Data transmission with different access protocols controlled by the circuit module 21 of the present invention will be illustrated as follows. When the card reader/writer 201 is made electrically connected to the circuit module 21, the control circuit 211 will automatically conduct a data transmission path between the card reader/writer 201 and the non-volatile memory 210 so that the digital data can be transmitted therebetween. Similarly, when the card reader/writer 202 or 203 is made electrically connected to the circuit module 21, a corresponding data transmission path will be conducted to transmit the digital data accordingly.

The circuit module 21 of FIG. 2B has a similar basic structure as that shown in FIG. 2A except that the non-volatile memory 210 and the control circuit 211 are integrated into the same chip 22. Since the control circuit can be produced by integral manufacturing process, it will not increase the chip size and/or production cost to form more than one transmission control circuits on the same chip 22.

Figure 3:
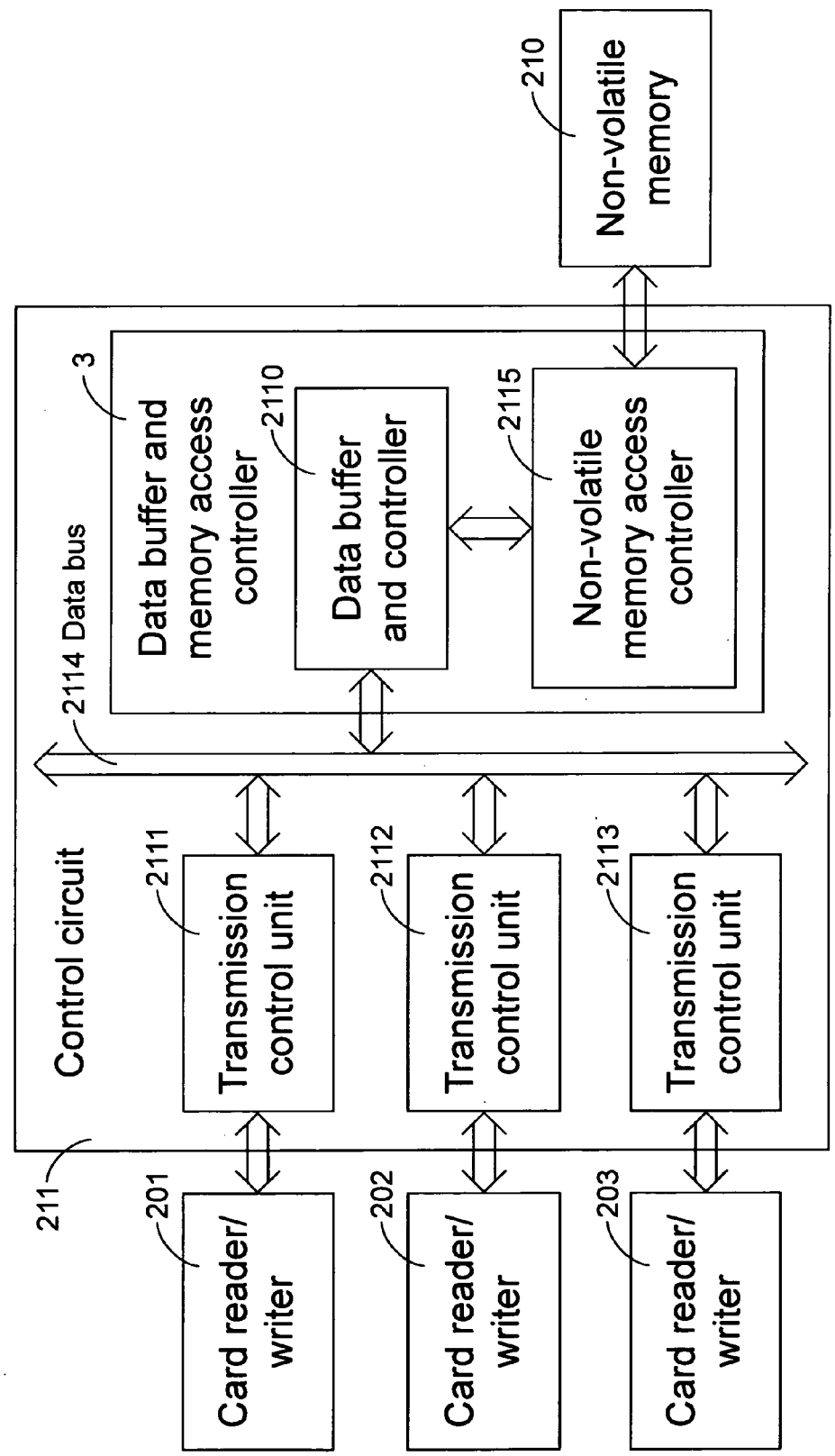
FIG. 3 is a functional block diagram illustrating exemplified control circuitry of the embodiments of FIGS. 2A & 2B.

Please refer to FIG. 3, in which an exemplified configuration of the control circuit 211 according to the present invention is shown. The control circuit 211 includes three transmission control units 2111, 2112 and 2113 compliant with different access protocols. For example, card reader/writer 201 is a secure digital reader/writer and the transmission control unit 2111 complies with access protocol of secure digital card so that the transmission control unit 2111 is communicable with the card reader/writer 201 to control data transmission from/to the card reader/writer 201. Similarly, the transmission control units 2112 and 2113 correspond to the card readers/writers 202 and 203 and operate under their access protocols, respectively. A data buffer and memory access controller 3 coupled to the non-volatile memory 210 and communicable with the transmission control units 2111, 2112 and 2113 via a data bus 2114. The data buffer and memory access controller 3 includes a data buffer and controller 2110 and a non-volatile memory access controller 2115. The non-volatile memory access controller 2115 is in communication with the non-volatile memory 210 for controlling the access to the non-volatile memory 210. The data buffer and controller 2110 optionally communicates with one of the transmission control units 2111, 2112 and 211.3 for data buffering and controlling data transmission from/to one of the transmission control units 2111, 2112 and 2113.

When the circuit module 21 is made electrically connected to the card reader/writer 201, the corresponding transmission control unit 2111 is automatically activated to conduct the data transmission path through the data bus 2114, data buffer and controller 2110, non-volatile memory access controller 2115 and non-volatile memory 210. Therefore, the data can be read from the non-volatile memory 210 through the non-volatile memory access controller 2115, data buffer and controller 2110, data bus 2114 and transmission control unit 2111 to the card reader/writer 201 or written into the non-volatile memory 210 through the transmission control unit 2111, data bus 2114, data buffer and controller 2110 and non-volatile memory access controller 2115.

In a similar manner, when the circuit module 21 is made electrically connected to the card reader/writer 202, the corresponding transmission control unit 2112 is automatically activated to conduct the data transmission path through the data bus 2114, data buffer and controller 2110, non-volatile memory access controller 2115 and non-volatile memory 210. Likewise, when the circuit is made electrically connected to the card reader/writer 203, the corresponding transmission control unit 2113 is automatically activated to conduct the data transmission path through the data bus 2114, data buffer and controller 2110, non-volatile memory access controller 2115 and non-volatile memory 210.

From the above description, it is understood that by integrating at least two transmission control units into the control circuit of a memory card to provide necessary transmission interfaces communicable with available card readers/writers, a universal control module can be produced to apply to various card readers/writers. Certainly, the number of the transmission control units is expandable to meet the user's demand. The transmission control units 2111, 2112 and 2113 and the data buffer and memory access controller 3 in this embodiment can be integrated into a single chip. Alternatively, the non-volatile memory 210 can be additionally integrated into the same chip. Since the control module 21 is applicable to various card readers/writers, a single circuit module chip instead of different kinds of controller chips is required for different kind of memory cards. When a specific specification of memory card, e.g. a memory stick card, is ordered, the manufacturer just needs to package the universal control module of the present invention with the housing of the ordered memory stick card. Once the package of the memory stick card is finished, it is ready for delivery. Hence, it is not necessary for the manufacturer to estimate the market demands for each kind of memory cards so that the production lines can be simplified and the stocking cost can be reduced.

Figure 4:
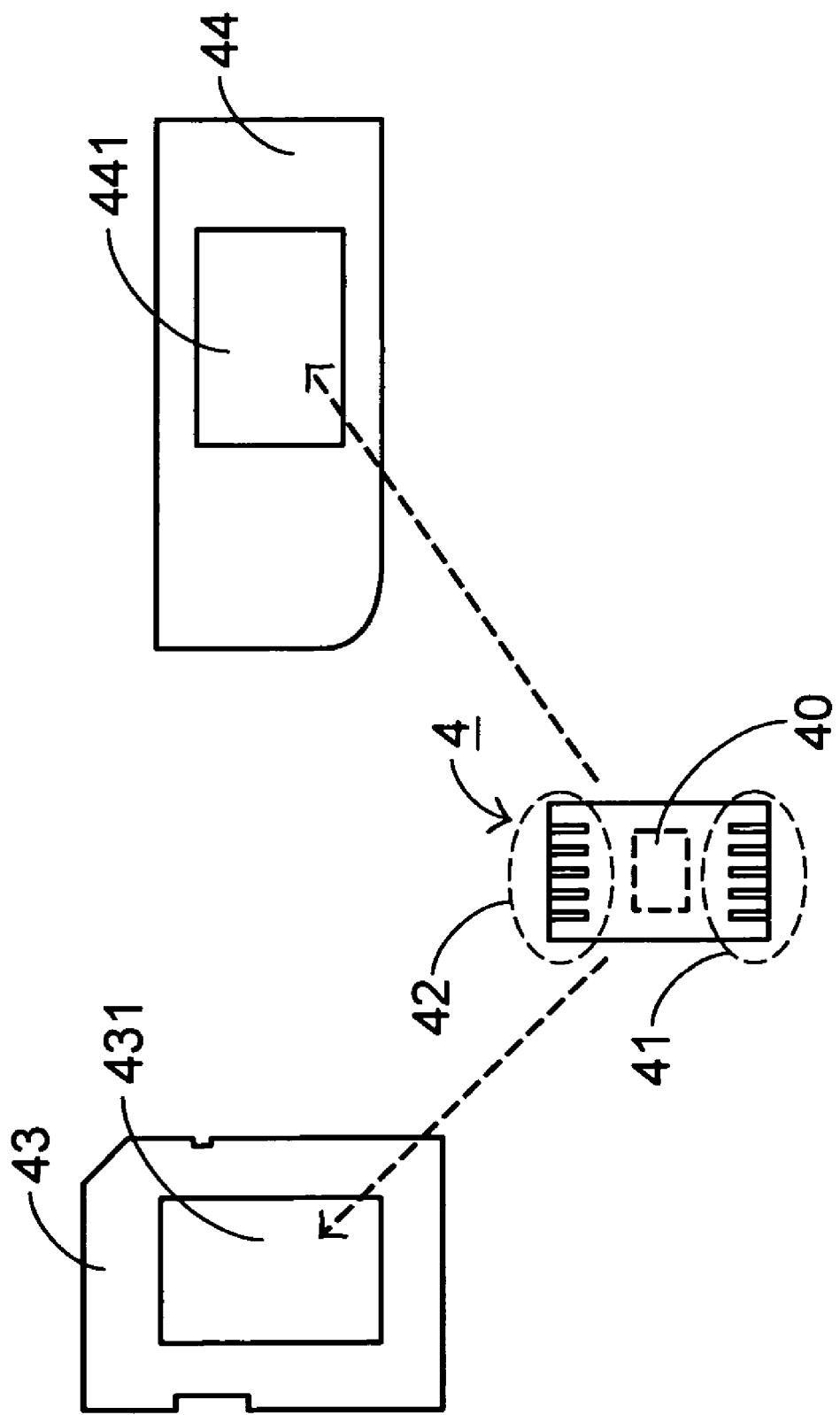
FIG. 4 is a schematic diagram illustrating a memory card kit according to another embodiment of the present invention.

For extending the use of the present invention, a memory card kid is provided by grouping the circuit module of the present invention with various housings and allowing them to be selectively combined. Please refer to FIG. 4 which is a schematic diagram illustrating the memory card kit according to an embodiment of the present invention. The circuit module 40 as described above is packaged with at least two connecting sites 41 and 42, which are to be electrically connected to the corresponding transmission control units built in the circuit module 40, to form a master part 4. The memory card kit also includes at least two carrier housings 43 and 44. Each of the carrier housings 43 and 44 has a room 431 or 441 for accommodating the master part 4. There are contacts (not shown) disposed in the rooms 431 and 441 corresponding to the connecting sites 41 and 42, respectively, for conducting electric connection therebetween. Hence, the elements of the memory card kit can be selectively used to result in different kinds of memory cards. For example, the carrier housing 43 has a configuration adapted to a secure digital card, and the carrier housing 44 has a configuration adapted to a memory stick card. If a secure digital reader/writer is available for data access, insert the master part 4 into the room 431 and make sure that the contact (not shown) in the room 431 is well coupled to the connecting site 41 for electric connection. Then, a simulated secure digital card is finished. Once the simulated secure digital card is inserted into the secure digital reader/writer, the secure digital transmission control unit in the circuit module will be automatically activated to conduct a data transmission path between the secure digital reader/writer and the non-volatile memory in the circuit module. Thus, the data transmission can be reached by taking advantage of the available secure digital reader/writer. In a similar manner, if a memory stick reader/writer is available, insert the master part 4 into the room 441 to simulate a memory stick card which can be accessed by the memory stick reader/writer.

From the above description, it is understood that the memory card kit according to the present invention can simulate many kinds of memory cards and achieve similar purposes by integrating a couple of transmission control units into the circuit module of the master part and providing a couple of carrier housings. The number of the transmission control units built in the circuit module can be determined according to the user's demands. The data stored in the non-volatile memory of the master part can be shared by various kinds of card readers/writers or digital cameras conveniently. The memory card kit can be easily and flexibly used with various card readers/writers or digital cameras that involve different access protocols even if they are mutually incompatible.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A memory card kit for selective use with a plurality of card readers/writers compliant with different access protocols, comprising:
   a shared circuit module having therein:
      a non-volatile memory; and
      a control circuit coupled to said non-volatile memory and communicable with the plurality of card readers/writers via a plurality of data transmission paths, respectively; and
   a plurality of carrier housings, each of which has a configuration fitting a connecting site of one of the plurality of card readers/writers and has a room for accommodating said shared circuit module, wherein when one of the plurality of card readers/writers is selected for use, said shared circuit module is mounted to a corresponding one of said plurality of carrier housings fitting the connecting site of the selected card reader/writer, and said corresponding carrier housing is further coupled to the selected card reader/writer to conduct one of said data transmission paths, thereby transmitting data between said non-volatile memory and the selected card reader/writer.

2. The memory card kit according to claim 1 wherein said non-volatile memory is a flash memory chip.

3. The memory card kit according to claim 1 wherein the plurality of card readers/writers includes a first card reader/writer compliant with a first access protocol and a second card reader/writer compliant with a second access protocol, said control circuit comprising:
   a first transmission control unit compliant with the first access protocol and optionally activated to conduct a first one of said plurality of data transmission paths for communicating said first card reader/writer with said non-volatile memory;
   a second transmission control unit compliant with the second access protocol and optionally activated to conduct a second one of said plurality of data transmission paths for communicating said second card reader/writer with said non-volatile memory; and
   a data buffer and memory access controller in communication with said non-volatile memory, said first transmission control unit and said second transmission control unit for controlling data transmission between said non-volatile memory and the first card reader/writer via said first data transmission path or data transmission between said non-volatile memory and the second card reader/writer via said second data transmission path.

4. The memory card kit according to claim 3 wherein said control circuit further comprises a data bus interfacing said first transmission control unit and said second transmission control unit with said data buffer and memory access controller for conducting said data transmission.

5. The memory card kit according to claim 4 wherein said data buffer and memory access controller comprises:
   a non-volatile memory access controller in communication with said non-volatile memory for controlling the access to said non-volatile memory; and a data buffer and controller in communication with said data bus and said non-volatile memory access controller for data buffering and controlling data transmission from/to said selected one of said first and second transmission control units via said data bus.

6. The memory card kit according to claim 3 wherein said first transmission control unit and said second transmission control unit are integrated into a chip.

7. The memory card kit according to claim 3 wherein said first transmission control unit, said second transmission control unit said data buffer and memory access controller are integrated into a chip.

8. The memory card kit according to claim 3 wherein said first transmission control unit, said second transmission control unit, said data buffer and memory access controller and said non-volatile memory are integrated into a chip.

* * * * *